(12) United States Patent
Hsieh

(10) Patent No.: US 8,228,011 B2
(45) Date of Patent: Jul. 24, 2012

(54) BI-DIRECTION DRIVER IC AND METHOD FOR BI-DIRECTIONALLY DRIVING AN OBJECT

(75) Inventor: Hui-Yen Hsieh, HsinChu (TW)

(73) Assignee: Chip Goal Electronics Corporation, HsinChu (TW)

( * ) Notice: Subject to any disclaimer, the term of this patent is extended or adjusted under 35 U.S.C. 154(b) by 322 days.

(21) Appl. No.: 12/704,733

(22) Filed: Feb. 12, 2010

(65) Prior Publication Data
US 2011/0199029 A1 Aug. 18, 2011

(51) Int. Cl.
*H02P 1/00* (2006.01)

(52) U.S. Cl. .............. 318/280; 318/564; 318/400.29; 318/535; 318/293; 318/601; 363/98; 363/17; 363/126; 361/23; 361/19; 361/56

(58) Field of Classification Search .......... 318/564, 318/400.26, 400.29, 400.3, 739, 763, 256, 318/280, 293, 294, 535, 400.28; 363/132
See application file for complete search history.

(56) References Cited

U.S. PATENT DOCUMENTS

| 4,451,848 A * | 5/1984 | Okada et al. ............ 348/448 |
| 2004/0095088 A1* | 5/2004 | Nakaho ............ 318/280 |
| 2007/0297205 A1* | 12/2007 | Chen et al. ............ 363/132 |
| 2008/0315804 A1* | 12/2008 | Nishibe et al. ............ 318/256 |

* cited by examiner

*Primary Examiner* — Walter Benson
*Assistant Examiner* — Jorge Carrasquillo
(74) *Attorney, Agent, or Firm* — Tung & Associates

(57) ABSTRACT

The present invention discloses a bi-direction driver IC and a method for bi-directionally driving an object. The method comprises: providing a first and a second integrated circuit (IC) chips, coupled with an object to be driven, wherein each of the first and second IC chips is capable of single-directionally driving the object; providing a reverse current path in each of the first and second IC chips; driving the object in a first direction by the first IC chip, wherein current flows through the reverse current path in the second IC chip; and driving the object in a second direction by the second IC chip, wherein current flows through the reverse current path in the first IC chip.

8 Claims, 4 Drawing Sheets

BI-DIRECTION DRIVER IC AND METHOD FOR BI-DIRECTIONALLY DRIVING AN OBJECT

BACKGROUND OF THE INVENTION

1. Field of Invention

The present invention relates to a bi-direction driver IC and a method for bi-directionally driving an object, such as for controlling a motor to rotate in two directions.

2. Description of Related Art

In certain applications, an object such as a motor needs to rotate bi-directionally, for controlling, e.g., a rear mirror of a vehicle. Referring to FIG. 1, a prior art bi-direction motor driver IC module requires at least three wires. In order to control the forward and backward rotations of the motor M, the IC module is provided with three pins, including two power pins and one control pin, wherein the positive power pin is connected to a positive voltage and the negative power pin is connected to ground (or a negative voltage); the third control pin CTL receives an external input signal which controls the rotation direction of the motor. In this prior art, the two power pins can not be interchanged; the positive power pin must be connected to the positive voltage, and the negative power pin must be connected to ground (or the negative voltage). However, in certain applications, the system only provides two AC power connections, such as in the control system for rear mirror of a vehicle. Presently, the majority of vehicles only provide two AC power connections. In this case, the three pin module can not function, because there is no control signal, and the three pin module can not cooperate with the AC power connections.

The current through an IC has to flow from its power supply to ground; the power pins thereof can not be reversely connected. If they are reversely connected, the IC can not operate and may be damaged. Because of the above reason, there has not been any bi-direction motor driver IC with only two pins in the past. Conventionally in the control system for vehicle rear mirror or other similar control systems, if it is required to operate in cooperation with two AC power connections, the control circuit is formed by multiple discrete devices. Yet, these discrete devices can not be integrated into a general IC.

In view of the disadvantages of the foregoing prior art, the present invention provides a bi-direction driver IC with two power pins, to be coupled to an AC power supply supplying alternating positive and negative voltages. The bi-direction driver IC can switch the direction of its output current, and hence it can be used for (but not limited to) driving a motor which requires to rotate in two directions. In addition, the present invention also provides a method for bi-directionally driving an object (for example but not limited to a motor).

SUMMARY OF THE INVENTION

An objective of the present is to provide a bi-direction driver IC.

Another objective of the present invention is to provide a method for bi-directionally driving an object.

To achieve the foregoing objectives, in one perspective of the present invention, it provides a bi-direction driver IC, comprising: a first power node for receiving power from a first power supply; a second power node for receiving power from a second power supply; at least one first chip coupled to the first power node, the at least one first chip including: a first transistor; a first diode coupled to the first transistor in parallel, the first diode having an anode-cathode direction opposite to a current direction through the first transistor; and a first control circuit controlling an operation of the first transistor, the first control circuit receiving power directly or indirectly from the second power supply; at least one second chip coupled to the second power node, the at least one second chip including: a second transistor; a second diode coupled to the second transistor in parallel, the second diode having an anode-cathode direction opposite to a current direction through the second transistor; and a second control circuit controlling an operation of the second transistor, the second control circuit receiving power directly or indirectly from the first power supply; wherein, when the first power supply is at a positive voltage, current flows through the first diode to the second chip, such that the second control circuit functions to turn on the second transistor; and when the second power supply is at a positive voltage, current flows through the second diode to the first chip, such that the first control circuit functions to turn on the first transistor.

In the foregoing bi-direction driver IC, at least one of the first and second transistors can be a MOS transistor or a BJT (Bipolar Junction Transistor). If the transistor is a MOS transistor, the first or second diode can be a parasitic diode of the MOS transistor.

In one embodiment, the first chip has a first ground pin coupled to the first power node, and the second chip has a second ground pin coupled to the second power node, wherein the first ground pin and the second ground pin are insulated from each other In one embodiment, the first chip further includes a first electrostatic protection diode connected in parallel with the first transistor, or the second chip further includes a second electrostatic protection diode connected in parallel with the second transistor, wherein at least one of the first and second electrostatic diode operates as a reverse current path.

In another perspective of the present invention, it provides a method for bi-directionally driving an object, comprising: providing a first and a second IC chips, coupled with an object to be driven, wherein each of the first and second IC chips is capable of single-directionally driving the object; providing a reverse current path in each of the first and second IC chips; driving the object in a first direction by the first IC chip, wherein current flows through the reverse current path in the second IC chip; and driving the object in a second direction by the second IC chip, wherein current flows through the reverse current path in the first IC chip.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustration only, not drawn according to actual scale.

Figure 1:
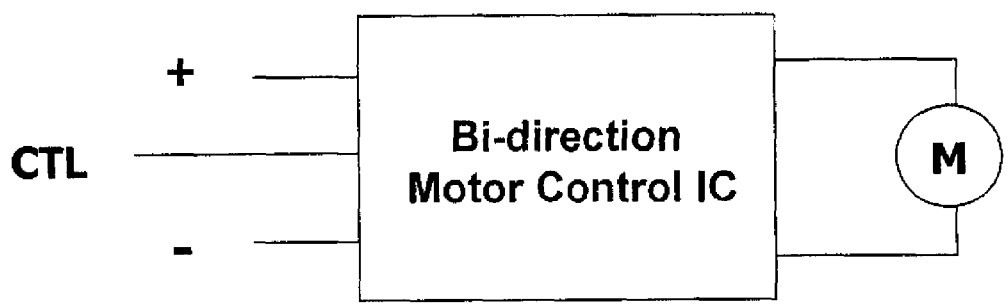
FIG. 1 shows a prior art three pin module for controlling a motor.
Figure 2:
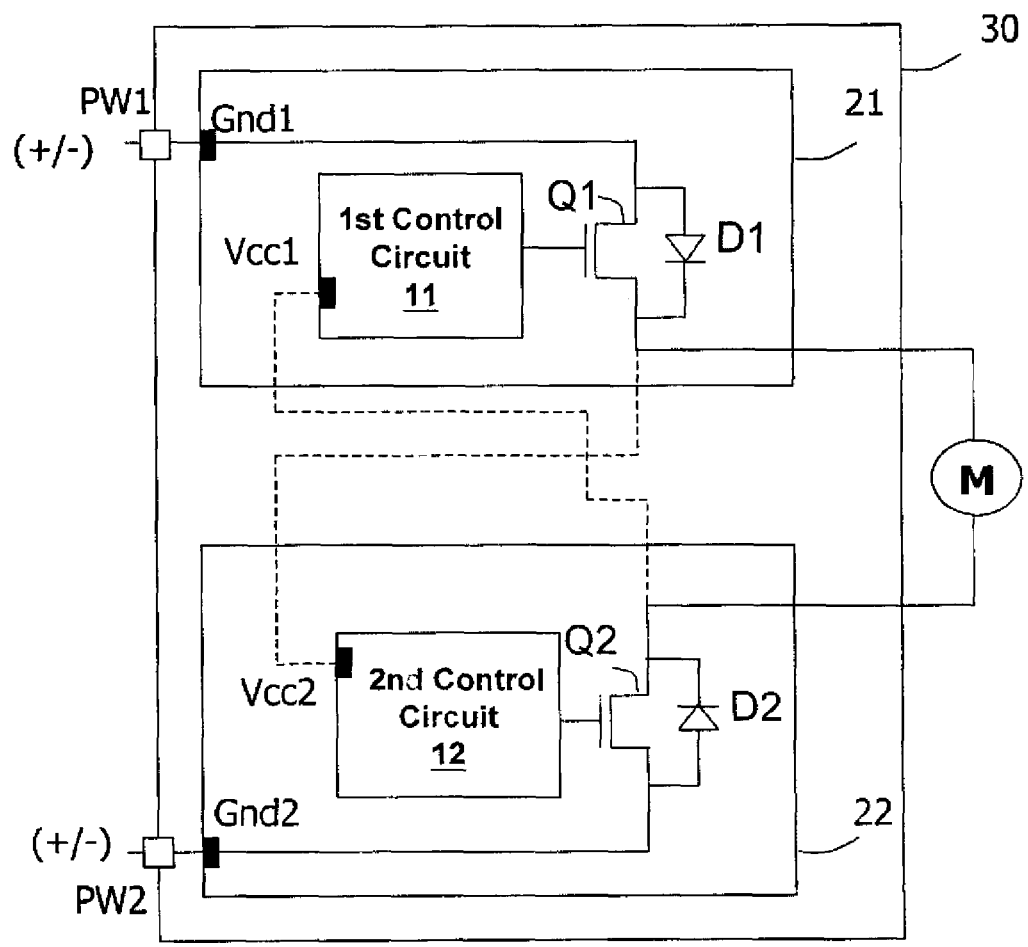
FIG. 2 is a circuit diagram showing a first embodiment of the present invention.
Figure 3:
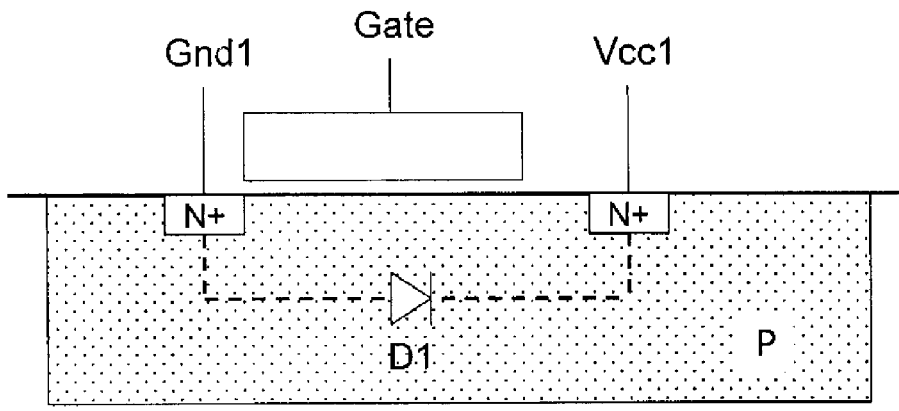
FIG. 3 shows a semiconductor structure of a transistor and a parasitic diode.

FIG. 2 shows an embodiment of the present invention by a circuit diagram. As shown in the drawing, in this embodiment, a first chip 21 and a second chip 22 are integrated into a bi-direction driver IC 30, wherein the first chip 21 includes a first control circuit 11 to control the operation of a first transistor Q1, and the second chip 22 includes a second control circuit 12 to control the operation of a second transistor Q2. The bi-direction driver IC 30 has a first power node PW1 and a second power node PW2 for receiving power from AC power supplies. The first chip 21 has a first ground pin Gnd1 coupled to the first power node PW1, and the second chip 22 has a second ground pin Gnd2 coupled to a second power node PW2. In addition, the first and second transistors Q1 and Q2 are respectively coupled to first and second diodes D1 and D2 in parallel but reversed, that is, the anode-cathode direction of the first diode D1 is opposite to the current direction through the first transistor Q1, and the anode-cathode direction of the second diode D2 is opposite to the current direction through the second transistor Q2. In this embodiment, the first and second transistors Q1 and Q2 are MOS transistors; hence, the first and second diodes D1 and D2 can be the parasitic diodes of the first and second transistors Q1 and Q2 respectively. Taking the first transistor Q1 for example, its semiconductor structure for example can be as shown in FIG. 3. Certainly, the first and second diodes D1 and D2 be additional diodes instead of the parasitic diodes of the first and second transistors Q1 and Q2.

In the first chip 21, a first internal power supply Vcc1 of the first control circuit 11 receives power directly or indirectly from the second power node PW2. In the second chip 22, a second internal power supply Vcc2 of the second control circuit 12 receives power directly or indirectly from the first power node PW1. When it is intended to drive the motor M in a first direction, e.g., forward rotation, the first control circuit 11 drives the first transistor Q1 to control the current flowing through the motor M. At this time point, the current flows from the second power node PW2, via the second ground pin Gnd2, the second diode D2 of the second chip 22, the motor M, and the first transistor Q1, to the first ground pin Gnd1 of the first chip 21. In this case, the second control circuit 12 is disabled; the first internal power supply Vcc1 of the first control circuit 11 can be provided, for example, via a path shown by the dashed line in the drawing.

Similarly, when it is intended to drive the motor M in a second direction, e.g., backward rotation, the second control circuit 12 drives the second transistor Q2 to control the current flowing through the motor M. At this time point, the current flows from the first power node PW1, via the first ground pin Gnd1, the first diode D1 of the first chip 21, the motor M, and the second transistor Q2, to the second ground pin Gnd2 of the second chip 22. In this case, the first control circuit 11 is disabled; the second internal power supply Vcc2 of the second control circuit 12 can be provided, for example, from a path shown by the dashed line in the drawing.

Figure 2A:
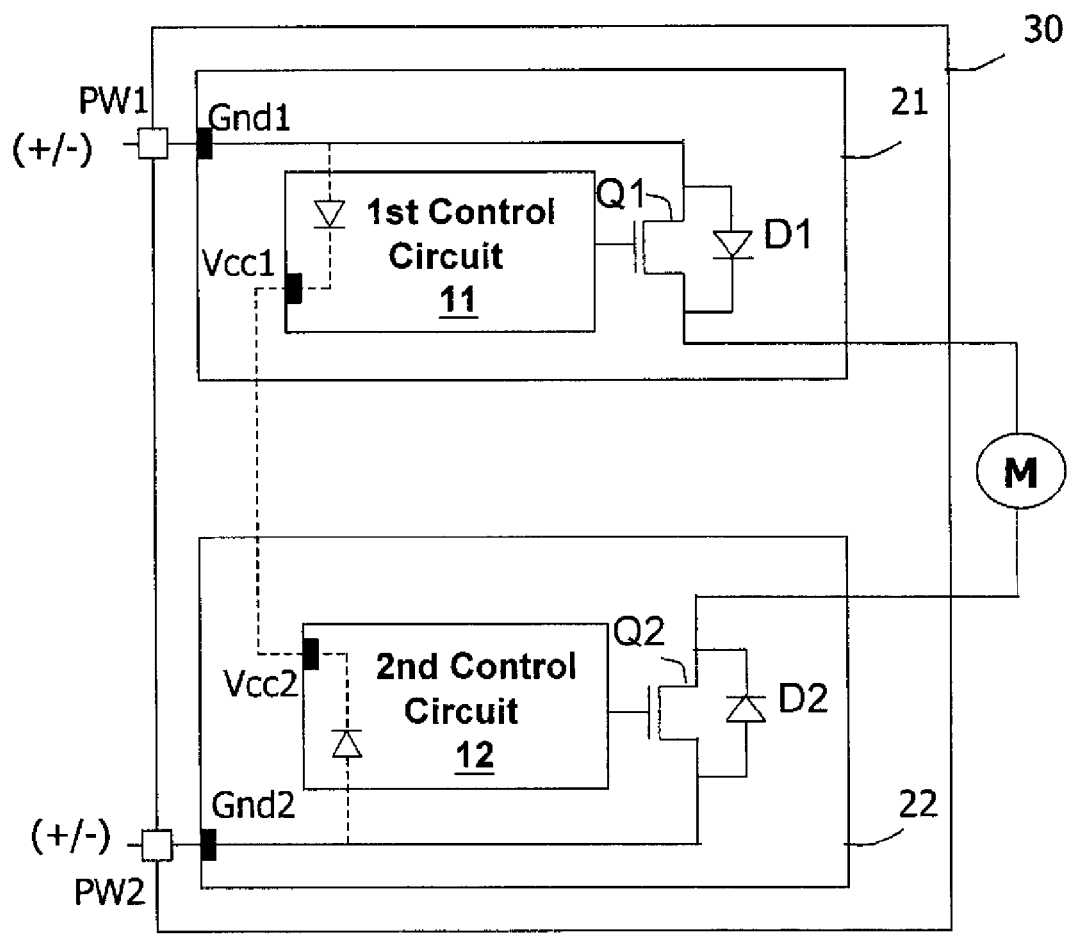
FIG. 2A illustrates an embodiment to provide internal power supplies Vcc1 and Vcc2.

Certainly, the path through which the second internal power supply Vcc2 receives power from the first power node PW1 (or through which the first internal power supply Vcc1 receives power from the second power node PW2) is not limited to that shown in FIG. 2, but can be arranged in any other way. For example, the first internal power supply Vcc1 can be directly coupled to the second power node PW2 (the second internal power supply Vcc2 can be directly coupled to the first power node PW1), or the first internal power supply Vcc1 can be coupled to the upper side of the motor M (the second internal power supply Vcc2 can be coupled to the lower side of the motor M), or the like. FIG. 2A shows another embodiment, wherein the first internal power supply Vcc1 of the first control circuit 11 and the second internal power supply Vcc2 of the second control circuit 12 are coupled to each other, and a diode is connected in reverse between the internal power supply Vcc1 and the ground pins Gnd1 (the anode-cathode direction of the diode is opposite to the power-ground direction), and likewise between the internal power supply Vcc2 and the ground pins Gnd2; the diodes for example can be parasitic diodes within the circuit. As such, the internal power supplies Vcc1 and Vcc2 required by the two control circuits 11 and 12 can be provided as well.

Figure 4:
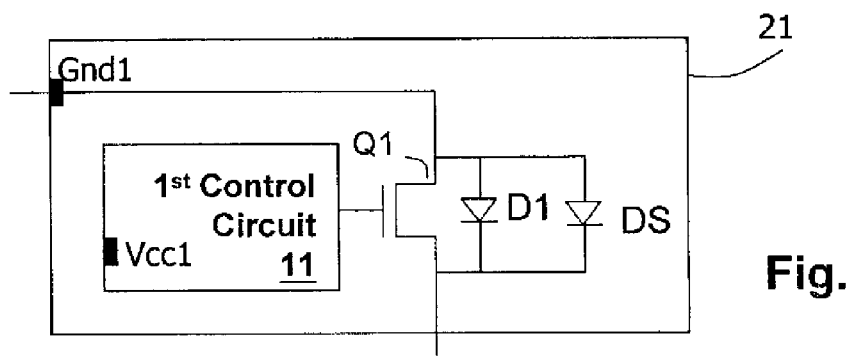
FIG. 4 is a circuit diagram showing a second embodiment of the present invention.
Figure 5:
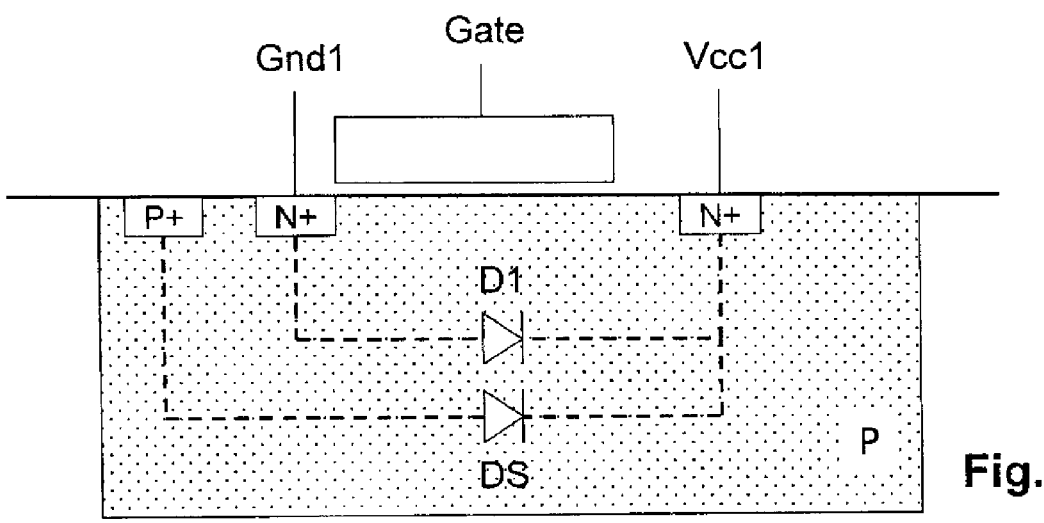
FIG. 5 shows a semiconductor structure of a transistor and an electrostatic protection diode.

To protect semiconductor devices from electrostatic damages, an electrostatic damage protection diode is often used in a semiconductor circuit. According to the present invention, an electrostatic damage protection diode DS can be provided, which can also be used as a reverse current path; that is, in addition to the parasitic diode D1 or D2, an electrostatic damage protection diode DS can be coupled with the first or second transistor Q1 or Q2 in parallel; for example, the first chip 21 may be as shown in FIG. 4. With respect to semiconductor structure, if the first or second transistor Q1 or Q2 is an NMOS transistor, other than providing another diode device connected to the first or second transistor Q1 or Q2 in parallel, the electrostatic diode DS can be embodied by a heavily doped region P+ nearby the drain of the transistor, as referring to FIG. 5 which shows an NMOS transistor as an example). More specifically, the heavily doped region P+ and the source at the farther side of the gate form the electrostatic damage protection diode DS which, in one aspect, provides electrostatic damage protection, while in another aspect, is used as the reverse current path when the motor M is driven bi-directionally.

Figure 6:
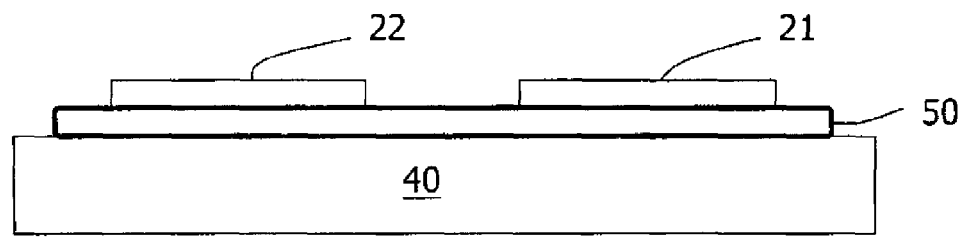
FIG. 6 shows that an insulating coating may be used for insulating the first ground pin of the first chip and the second ground pin of the second pin from each other.

As mentioned earlier, when the first transistor Q1 is driven, the second ground pin Gnd2 receives the positive voltage and the first ground pin Gnd1 is coupled to ground (or a negative voltage). When the second transistor Q2 is driven, the first ground pin Gnd1 receives the positive voltage and the second ground pin Gnd2 is coupled to ground (or a negative voltage). Thus, the "ground" pins Gnd1 and Gnd2 are at different potentials; although both of them are referred to as ground pins, they should actually be insulated from each other, not connected in short. The two ground pins can be insulated in any way, as long as they are not connected in short. Refer to FIG. 6 for one example, for better integration and package, the first chip 21 and the second chip 22 can be insulated from each other by an insulating material 50 when packaged. The insulating material 50 for example can be an insulating coating with stickiness so as to bond the two chips with a lead frame 40 to become a bi-direction driver IC.

Figure 7:
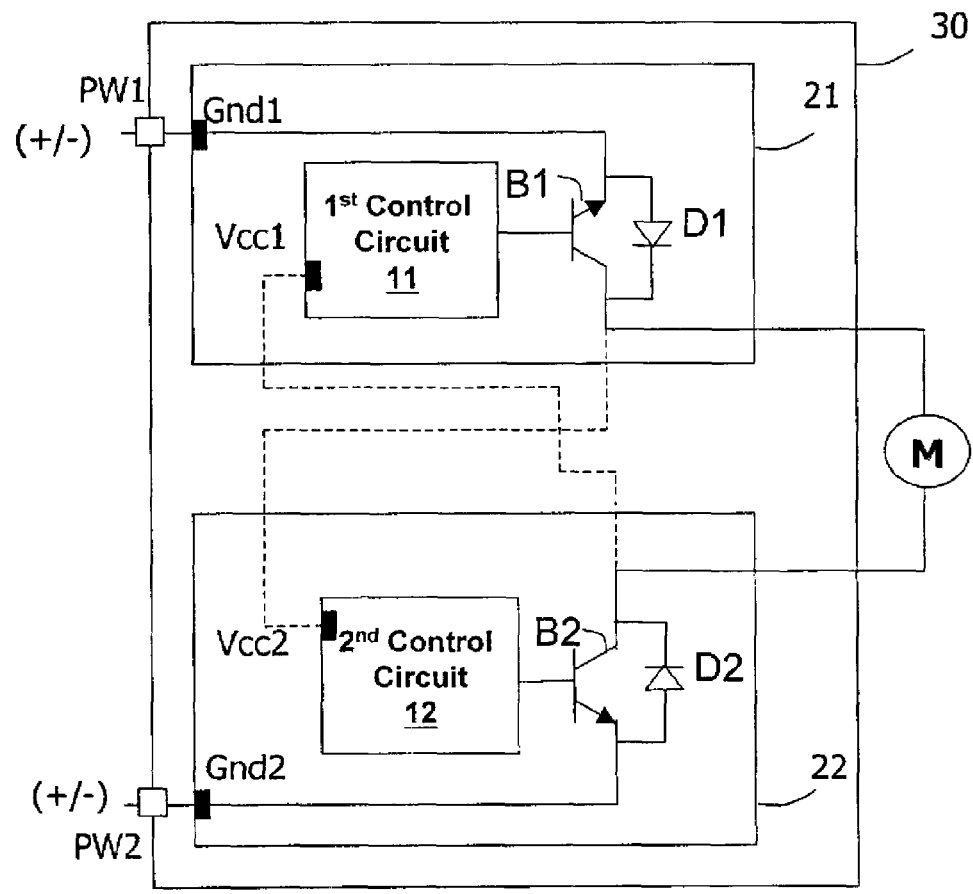
FIG. 7 is a circuit diagram showing a third embodiment of the present invention.

The foregoing MOS transistors Q1 and Q2 can be replaced by BJTs as shown in FIG. 7, which also falls within the scope of the present invention. Similarly to the embodiment of the MOS transistors, the path through which the first power node PW1 supplies power to the second internal power supply Vcc2 (or through which the second power node PW2 supplies power to the first internal power supply Vcc1) is not limited to that shown in FIG. 7, but can be any other way, as referring to the foregoing description in connection with FIG. 2 and FIG. 2A.

The bi-direction driver IC proposed in each of the foregoing embodiments can be used for controlling a motor or any object requiring currents to flow bi-directionally. For example, the present invention can be employed to drive a rear mirror of a vehicle, a projector screen, an extension holder of a CD-ROM player or of a DVD-ROM player, an automatic door, or the like.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the arrangement of the first transistor and the second transistor Q1 and Q2 of the present invention is not limited to two MOS transistors or two BJTs; it can be one MOS transistor and one BJT. In addition, the bi-direction driver IC is not limited to a combination of one first chip and one second chip; it can be a combination of more number of chips. In view of the foregoing, the spirit of the present invention should cover all such and other modifications and variations, which should be interpreted to fall within the scope of the following claims and their equivalents.

What is claimed is:

1. A bi-direction driver IC (Integrated Circuit), comprising:
    a first power node for receiving power from a first power supply;
    a second power node for receiving power from a second power supply;
    at least one first chip coupled to the first power node, the at least one first chip including:
        a first transistor;
        a first diode coupled to the first transistor in parallel, the first diode having an anode-cathode direction opposite to a current direction through the first transistor; and
        a first control circuit controlling an operation of the first transistor, the first control circuit receiving power directly or indirectly from the second power supply;
    at least one second chip coupled to the second power node, the at least one second chip including:
        a second transistor;
        a second diode coupled to the second transistor in parallel, the second diode having an anode-cathode direction opposite to a current direction through the second transistor; and
        a second control circuit controlling an operation of the second transistor, the second control circuit receiving power directly or indirectly from the first power supply;
    wherein, when the first power supply is at a positive voltage, current flows through the first diode to the second chip, such that the second control circuit functions to turn on the second transistor; and
    when the second power supply is at a positive voltage, current flows through the second diode to the first chip, such that the first control circuit functions to turn on the first transistor.

2. The bi-direction driver IC of claim 1, wherein the first chip has a first ground pin coupled to the first power node, and the second chip has a second ground pin coupled to the second power node, and wherein the first ground pin and the second ground pin are insulated from each other.

3. The bi-direction driver IC of claim 2, wherein the first ground pin of the first chip and the second ground pin of the second chip are insulated from each other by an insulating coating.

4. The bi-direction driver IC of claim 1, wherein the first chip further includes a first electrostatic protection diode connected in parallel with the first transistor.

5. The bi-direction driver IC of claim 1, wherein the second chip further includes a second electrostatic protection diode connected in parallel with the second transistor.

6. The bi-direction driver IC of claim 1, wherein the first transistor is a MOS transistor, and the first diode is a parasitic diode of the first transistor.

7. The bi-direction driver IC of claim 1, wherein the second transistor is a MOS transistor, and the second diode is a parasitic diode of the second transistor.

8. The bi-direction driver IC of claim 1, wherein at least one of the first transistor and the second transistor is a BJT (bipolar junction transistor).

* * * * *